United States Patent
Daugherty et al.

(10) Patent No.: US 12,178,160 B2
(45) Date of Patent: *Dec. 31, 2024

(54) END EFFECTOR FOR HARVESTING

(71) Applicant: Tortuga Agricultural Technologies, Inc., Denver, CO (US)

(72) Inventors: Jaylyn Daugherty, Lakewood, CO (US); Gregory Schroll, Denver, CO (US); Timothy Brackbill, Lakewood, CO (US)

(73) Assignee: Tortuga Agricultural Technologies, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,505

(22) Filed: Jun. 19, 2023

(65) Prior Publication Data

US 2023/0329149 A1     Oct. 19, 2023

Related U.S. Application Data

(63) Continuation of application No. 17/847,912, filed on Jun. 23, 2022, which is a continuation of application
(Continued)

(51) Int. Cl.
*A01D 46/30* (2006.01)
*B25J 11/00* (2006.01)
*B26D 7/01* (2006.01)

(52) U.S. Cl.
CPC .......... *A01D 46/30* (2013.01); *B25J 11/0055* (2013.01); *B26D 7/01* (2013.01)

(58) Field of Classification Search
CPC ....... A01D 46/30; B25J 11/0055; B26D 7/01; B26D 7/02; A01G 2003/023; B26B 17/00; B26B 17/003; B26B 17/006
(Continued)

(56) References Cited

U.S. PATENT DOCUMENTS

| 608,807 | A | * | 8/1898 | Tilden | ................... | B23D 17/00 |
| | | | | | | 30/134 |
| 681,972 | A | * | 9/1901 | Postelwatt | ............ | B23D 17/00 |
| | | | | | | 30/226 |

(Continued)

FOREIGN PATENT DOCUMENTS

| CN | 106233938 | 6/2018 |
| CN | 111958624 | 11/2020 |

(Continued)

OTHER PUBLICATIONS

Tortuga Agtech, "Website Video 2", YouTube video, Jan. 9, 2020, accessed at https://www.youtube.com/watch?v=ZY-iAUyTyHY.
(Continued)

*Primary Examiner* — Evan H MacFarlane
*Assistant Examiner* — Fernando A Ayala
(74) *Attorney, Agent, or Firm* — Van Pelt, Yi & James LLP

(57) ABSTRACT

An end effector includes a cutting mechanism, a gripping mechanism, and a pivot component. The cutting mechanism and the gripping mechanism are coupled to the pivot component. The cutting mechanism is coupled to a first portion of the pivot component and the gripping mechanism is coupled to a second portion of the pivot component.

14 Claims, 3 Drawing Sheets

Related U.S. Application Data

No. 17/168,019, filed on Feb. 4, 2021, now Pat. No. 11,406,060.

(58) Field of Classification Search
USPC .................. D30/158; 30/159, 173, 125, 131
See application file for complete search history.

(56) References Cited

U.S. PATENT DOCUMENTS

| | | | | |
|---|---|---|---|---|
| 778,140 | A * | 12/1904 | PAff | B23D 17/00 30/134 |
| 1,467,262 | A * | 9/1923 | Barker | A01G 3/033 269/34 |
| 1,493,539 | A * | 5/1924 | Hess | A01G 3/02 30/135 |
| 2,028,239 | A * | 1/1936 | Oths | A47J 25/00 30/174 |
| 2,366,609 | A | 1/1945 | Gates | |
| 2,366,909 | A | 1/1945 | Johnson | |
| 2,446,011 | A * | 7/1948 | Johnson | A01G 3/033 30/372 |
| 2,493,696 | A | 1/1950 | Magdalena | |
| 2,540,255 | A * | 2/1951 | Graves | A01D 46/247 30/232 |
| 2,930,122 | A | 3/1960 | Pfundt | |
| 3,039,189 | A | 6/1962 | McBerty | |
| 3,584,381 | A | 6/1971 | Jamison | |
| 3,685,151 | A | 8/1972 | Grante | |
| 3,693,254 | A | 9/1972 | Salonen | |
| 5,189,794 | A * | 3/1993 | Kuo | A01G 3/02 30/135 |
| 5,272,811 | A | 12/1993 | Armand | |
| 5,695,521 | A * | 12/1997 | Anderhub | A61B 17/29 606/205 |
| 5,704,560 | A | 1/1998 | Wimmer | |
| 5,826,341 | A * | 10/1998 | Massa | A01G 3/08 30/296.1 |
| 6,530,099 | B1 * | 3/2003 | Iwinski | B25B 7/00 81/421 |
| 7,331,109 | B2 | 2/2008 | Tu | |
| 7,540,093 | B1 | 6/2009 | Yeh | |
| 8,209,871 | B1 * | 7/2012 | Palmby | B26B 13/16 30/261 |
| 9,832,936 | B2 * | 12/2017 | Ishiguro | B26B 15/00 |
| 2003/0159296 | A1 * | 8/2003 | Tapia | B26B 17/00 30/175 |
| 2004/0134074 | A1 * | 7/2004 | Lin | A01G 3/083 30/146 |
| 2009/0038162 | A1 * | 2/2009 | Shan | A01G 3/0255 30/249 |
| 2009/0082795 | A1 * | 3/2009 | Blocher | A61B 17/29 606/167 |
| 2011/0313449 | A1 * | 12/2011 | Cooper | A61B 17/3201 29/428 |
| 2013/0219722 | A1 * | 8/2013 | Cordoba Sanchez | A01G 3/02 30/173 |
| 2013/0313449 | A1 | 11/2013 | Weir | |
| 2017/0000027 | A1 | 1/2017 | Hunt | |

FOREIGN PATENT DOCUMENTS

| | | |
|---|---|---|
| JP | S56111729 U | 8/1981 |
| JP | 59107886 | 6/1984 |
| JP | H04068647 U | 6/1992 |
| JP | 2004180554 | 7/2004 |
| JP | 2005176745 | 7/2005 |
| JP | 2006061162 | 3/2006 |
| JP | 2016192943 | 11/2016 |
| JP | 2019037214 | 3/2019 |
| KR | 200474257 | 9/2014 |
| WO | 2019177528 | 9/2019 |
| WO | 2020159123 | 8/2020 |

OTHER PUBLICATIONS

Hara et al. "Holding after cutting strategy and design technique utilizing elasticity of picking fingers." Transactions of the Journal of the Japan Society of Mechanical Engineers (JSME), vol. 81, No. 830, 2015, pp. 1-12.

Yaguchi et al. "A research of construction method for autonomous tomato harvesting robot focusing on harvesting device and visual recognition." Journal of the Robotic Society of Japan, vol. 36, No. 10, 2018, pp. 693-702.

* cited by examiner

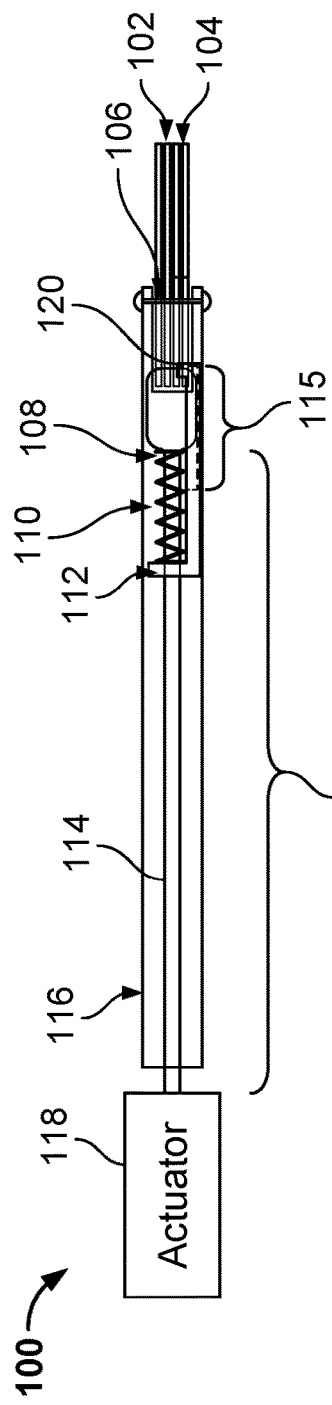
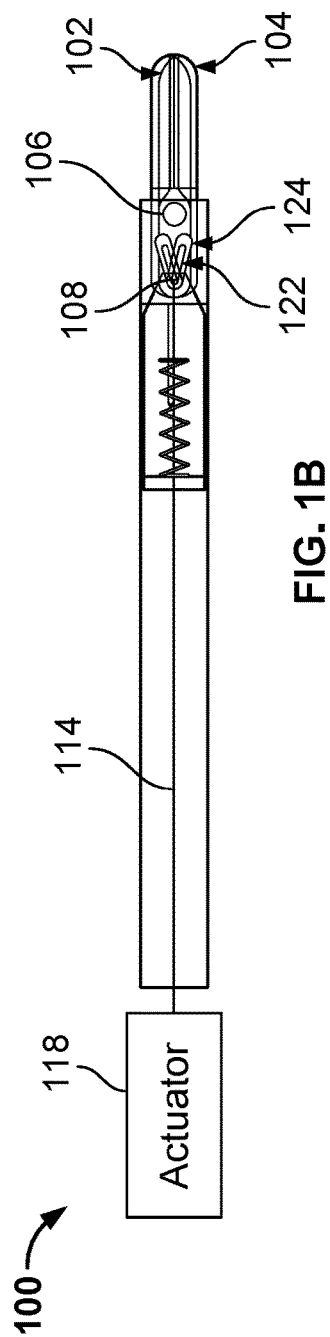
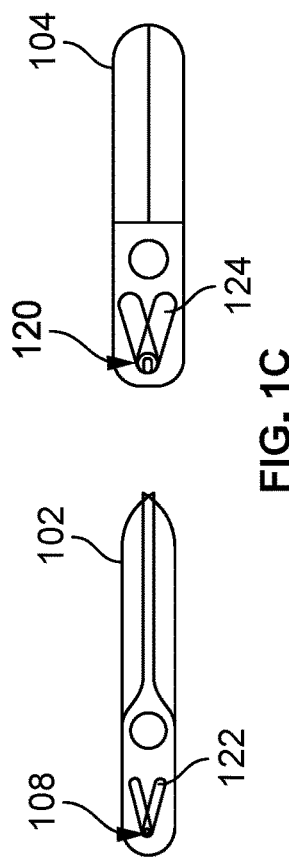
FIG. 1A
FIG. 1B
FIG. 1C

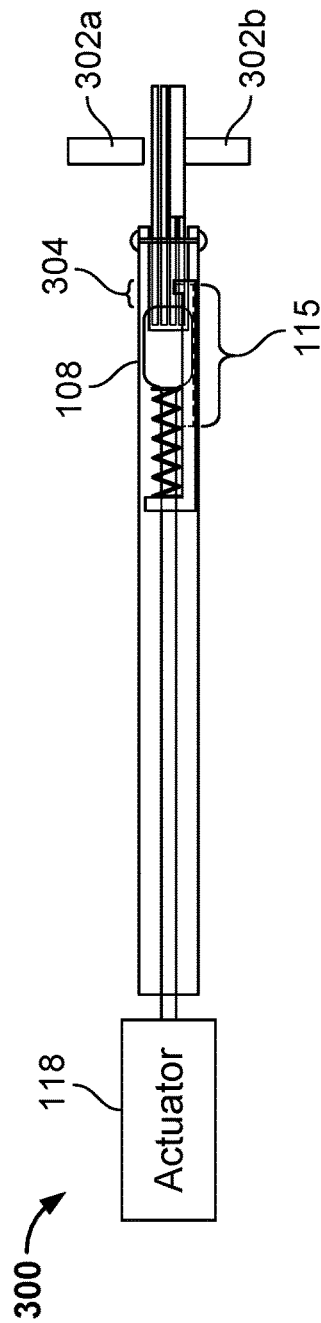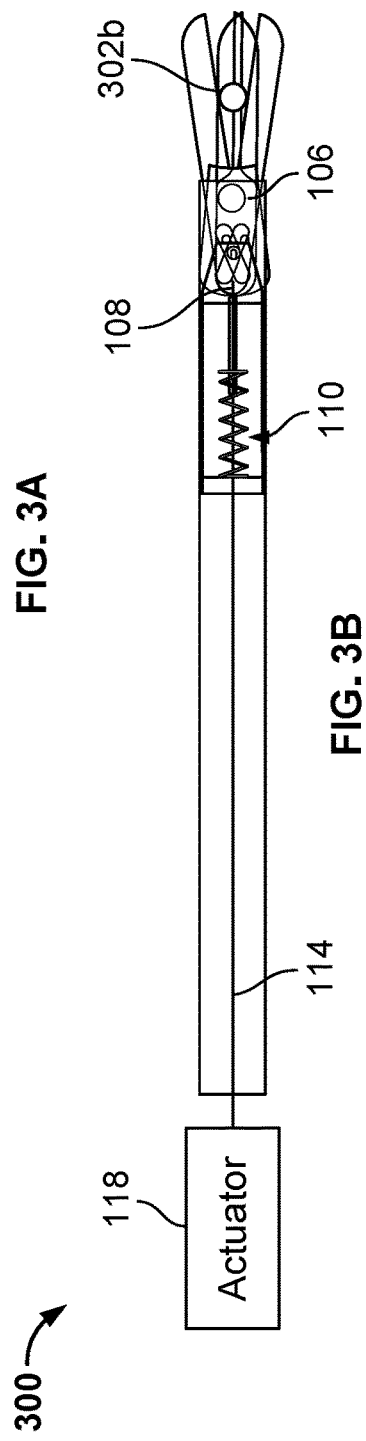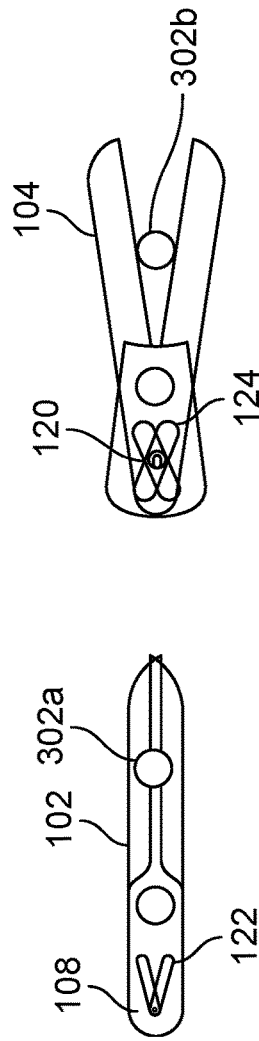
FIG. 3A
FIG. 3B
FIG. 3C

END EFFECTOR FOR HARVESTING

CROSS REFERENCE TO OTHER APPLICATIONS

This application is a continuation of U.S. patent application Ser. No. 17/847,912 entitled END EFFECTOR FOR HARVESTING filed Jun. 23, 2022, which is a continuation of U.S. patent application Ser. No. 17/168,019, now U.S. Pat. No. 11,406,060, entitled END EFFECTOR FOR HARVESTING filed Feb. 4, 2021, each of which is incorporated herein by reference for all purposes.

BACKGROUND OF THE INVENTION

Robotic systems are being used to harvest crops to reduce labor costs associated with harvesting crops. These robotic systems may include an end effector that is designed to remove a crop from its environment. Although labor costs may be reduced by implementing a robotic system, the end effector may damage a crop when the crop is removed from its environment. For example, an end effector may include a plurality of digits that are used to grab and twist a piece of fruit from a vine. This grabbing and twisting motion may accidentally damage the piece of fruit. As a result, the labor cost savings from the robotic systems are offset by losses due to damaged crops. Better end effectors are needed to efficiently harvest crops.

BRIEF DESCRIPTION OF THE DRAWINGS

Various embodiments of the invention are disclosed in the following detailed description and the accompanying drawings.

FIG. 1A is a diagram illustrating a side view of an end effector in accordance with some embodiments.

FIG. 1B is a diagram illustrating a top-down view of an end effector in accordance with some embodiments.

FIG. 1C is a diagram illustrating a top-down view of a cutting mechanism and a gripping mechanism in accordance with some embodiments.

FIG. 3A is a diagram illustrating a side view of an end effector in accordance with some embodiments.

FIG. 3B is a diagram illustrating a top-down view of an end effector in accordance with some embodiments.

FIG. 3C is a diagram illustrating a top-down view of a cutting mechanism and a gripping mechanism in accordance with some embodiments.

DETAILED DESCRIPTION

Figure 2A:
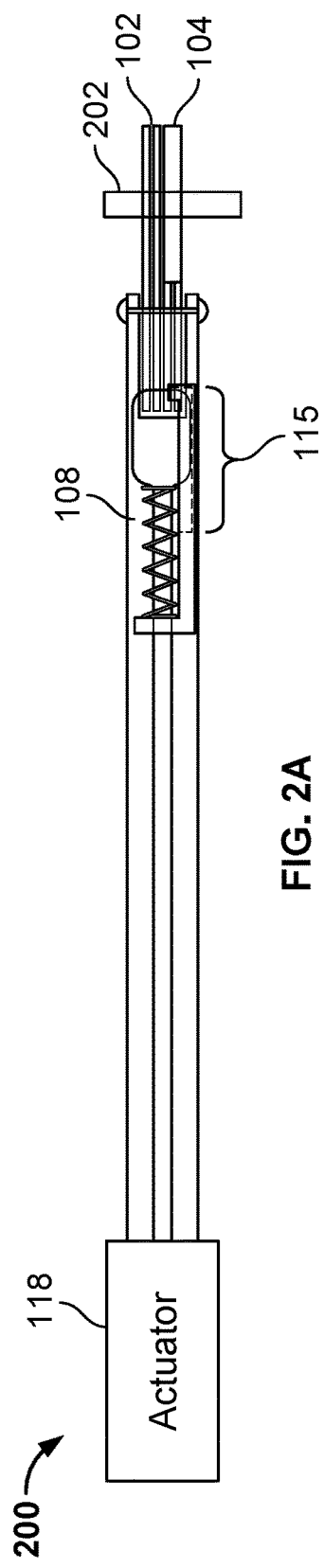
FIG. 2A is a diagram illustrating a side view of an end effector in accordance with some embodiments.

The invention can be implemented in numerous ways, including as a process; an apparatus; a system; a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An end effector for cutting an appendage of a plant is disclosed. The end effector is comprised of a cutting mechanism and a gripping mechanism. The cutting mechanism and the gripping mechanism include corresponding sets of jaws. The end effector is configured to open and close, in parallel, the cutting mechanism and the gripping mechanism. The plant may include an appendage (e.g., stem, vine, branch, stalk, etc.) and an object to be harvested (e.g., flower, piece of fruit, etc.) When the cutting mechanism and gripping mechanism are open, an appendage of the plant may be placed in an opening associated with the corresponding sets of jaws. An actuator associated with the end effector may apply a force that causes the cutting mechanism and the gripping mechanism to close. The applied force may cause the cutting mechanism to perform a bypass cut that splits the plant appendage into a first portion and a second portion while the applied force causes the gripping mechanism to grasp the second portion of the plant appendage that is coupled to the object to be harvested. As a result, the end effector is able to remove the harvested object from the plant without damaging the harvested object.

FIGS. 1A, 1B are diagrams illustrating a side view and a top-down view of an end effector, respectively, in accordance with some embodiments. In the example shown, end effector 100 includes cutting mechanism 102 and a gripping mechanism 104.

Cutting mechanism 102 includes a cutting set of jaws. In some embodiments, the cutting set of jaws is an anvil-style cutting mechanism. In some embodiments, the cutting set of jaws is a bypass-style cutting mechanism. In some embodiments, the cutting set of jaws is a flush style cutting mechanism.

Gripping mechanism 104 includes a gripping set of jaws. In some embodiments, the gripping set of jaws is a plier-style gripping mechanism. In some embodiments, the gripping set of jaws includes varyingly shaped textures or teeth. In some embodiments, the gripping set of jaws are flat and tapered.

Cutting mechanism 102 and gripping mechanism 104 are mechanically coupled to each other via a coupling mechanism, which may include pivot component 106. Pivot component 106 may be a pin, a screw, a bolt, a fastener, a dowel, a peg, etc. Cutting mechanism 102 is coupled to a first portion of pivot component 106 and gripping mechanism 104 is coupled to a second portion of pivot component 106. The first portion is a top portion of pivot component 106 and the second portion is a bottom portion of pivot component 106. For example, end effector 100 may be used to remove a piece of fruit that is hanging from a vine. When end effector 100 is used to remove the piece of fruit, cutting mechanism 102 may cut the vine while the gripping mechanism grasps the part of the vine attached to the fruit, which prevents the fruit from falling to the ground and potentially being damaged. In some embodiments, the first portion is a bottom portion of pivot component 106 and the second portion is a top portion of pivot component 106. For example, end effector 100 may be used to harvest a flower. When end effector 100 is used to harvest a flower, cutting mechanism 102 may cut the flower from a bottom portion of a stem while the gripping mechanism grasps the part of the stem attached to the flower, which prevents the fruit from falling to the ground and potentially being damaged. In some embodiments, pivot component 106 is comprised of two pivot components. The two pivot components may be staggered such that a first pivot component associated with cutting mechanism 102 does not overlap with a second pivot component associated with gripping mechanism 104. In some embodiments, cutting mechanism 102 and gripping mechanism 104 are coupled to each other via a different coupling mechanism, such as a linear coupling with an angled block and return springs.

End effector 100 includes an actuation connection structure 114 that is configured to open and close, in parallel, cutting mechanism 102 and gripping mechanism 104. Actuation connection structure 114 may include a straight portion 113 and a loop portion 108. Actuation connection structure 114 may be a wire form, an assembly of a mold or machined part and a metal pin, or other rigid material, such as a plastic, a polymer, a composite material, or any other type of rigid material that is capable of withstanding a force from actuator 118 when cutting mechanism 102 and gripping mechanism 104 are opened and closed.

Cutting mechanism 102 and gripping mechanism 104 include corresponding slot openings (shown in FIGS. 1B and 1B). The slot openings may be angled slot openings (same angle or different angle), straight slot openings, curved slot openings, or follow a compound path. Loop portion 108 of actuation connection structure 114 may be interlocked with cutting mechanism 102 and gripping mechanism 104 via the corresponding slot openings. The slot openings associated with cutting mechanism 102 and the slot openings associated with gripping mechanism 104 have different widths. The slot opening width associated with gripping mechanism 104 is wider than the slot opening width associated with cutting mechanism 102. In some embodiments, the slot opening width associated with cutting mechanism 102 is the width of the loop portion 108 of actuation connection structure 114. In some embodiments, the slot opening width associated with cutting mechanism 102 is wider than a width of the loop portion 108 of actuation connection structure 114 by a threshold amount (e.g., 2 mm), but narrower than a slot opening width associated with gripping mechanism 104.

In some embodiments, actuation connection structure 114 includes a straight portion 113 that is coupled to an inclined ramp that can be pulled or pushed upon. In some embodiments, actuation connection structure 114 includes a straight portion 113 and a screw mechanism that is capable of being rotated through the straight portion 113. The rotation of the screw mechanism applies a force that causes cutting mechanism 102 and gripping mechanism 104 to open or close, in parallel.

End effector 100 includes a bias mechanism 110. In some embodiments, bias mechanism 110 is an axial spring that surrounds actuation connection structure 114. In some embodiments, bias mechanism 110 is an angular spring around a rotating mechanism. In some embodiments, bias mechanism 110 is a compliant mechanism, elastomeric, or otherwise.

The bias mechanism may be placed between a proximal end of loop portion 108 and a proximal end of bias limiting component 112. Bias limiting component 112 may be an L-shaped structure. The proximal end of bias limiting component 112 may include a U-shaped opening that enables it to be attached to actuation connection structure 114. The proximal end of bias limiting component 112 is coupled to a first end of bias mechanism 110. The distal end of bias limiting component 112 is coupled to the slot opening associated with gripping mechanism 104 via a knob feature 120. Bias limiting component 112 includes a groove portion 115 that enables loop portion 108 to pass through bias limiting component 112. In this example, the groove portion 115 is U-shaped.

End effector 100 includes a housing 116. Housing 116 may be long narrow mechanical segment that enables cutting mechanism 102 and gripping mechanism 104 to get close to a point of cutting without disturbing the parts of a plant, other fruit, flowers, or other mechanical aspects of a grow. In some embodiments, housing 116 is a hollow tube. In some embodiments, housing 116 is a long extrusion of alternative cross section. In some embodiments, housing 116 is an external mechanical skeleton that is not an extrusion. Housing 116 may surround actuation connection structure 114, bias mechanism 110, bias limiting component 112, a proximal end of cutting mechanism 102, and a proximal end of gripping mechanism 104.

End effector 100 includes actuator 118. In some embodiments, actuator 118 is a servo motor, a stepper motor, or any other type of electromagnetic motor. In some embodiments, actuator 118 is a pneumatic motor, hydraulic motor, or any other type of rotational actuator. In some embodiments, actuator 118 is a linear actuator powered by pneumatics, electromagnetics, or hydraulics. In some embodiments, actuator 118 applies a force that causes cutting mechanism 102 and gripping mechanism 104 to open in parallel. In some embodiments, actuator 118 applies the force after an appendage of a plant is cut into two portions and a harvested object is placed in a tray or bin for storage.

Actuator 118 applies the force prior to attempting to harvest an object from a plant. In some embodiments, the applied force causes cutting mechanism 102 and gripping mechanism 104 to open a particular amount. For example, the end effector may be used harvest a plurality of hanging fruit that are proximally located in a grow environment. The distance between the vines associated with the plurality of hanging fruit may vary. When attempting to harvest a particular fruit, actuator 118 may cause cutting mechanism 102 and gripping mechanism 104 to open a particular amount instead of fully opening cutting mechanism 102 and gripping mechanism 104 to avoid accidentally disturbing and potentially damaging other plants, fruits, vines, flowers, etc. that are located in the grow.

In some embodiments, actuator 118 applies a force that causes cutting mechanism 102 and gripping mechanism 104 to close in parallel. In some embodiments, in response to feedback that the appendage of a plant has not been completely severed, actuator 118 applies an additional force that causes cutting mechanism 102 to apply more force to the appendage. The additional force, as described herein, does not cause gripping mechanism 104 to apply more force to the appendage.

In some embodiments, end effector 100 remains in a closed state after an object is harvested and is changed to an open state prior to an attempt to harvest a next object from a plant. In some embodiments, end effector 100 changes to an open state after an object is harvested in order to release it into a storage location.

FIG. 1B is a diagram illustrating a top-down view of an end effector in accordance with some embodiments. In the example shown, end effector 150 includes a cutting mechanism 102, a gripping mechanism 14, and a pivot component 106. Cutting mechanism 102 includes slot openings 122 and gripping mechanism 104 includes slot openings 124. Loop portion 108 of actuation connection structure 114 is interlocked with slot openings 122 and slot openings 124.

FIG. 1C is a diagram illustrating a top-down view of a cutting mechanism and a gripping mechanism in accordance with some embodiments. In the example shown, cutting mechanism 102 includes slot openings 122. The loop portion 108 of actuation connection structure 114 is interlocked with slot openings 122 and slot openings 124. Gripping mechanism 104 includes slot openings 124. The knob feature 120 of bias limiting component 112 is coupled to slot openings 124. Bias limiting component 115 includes a groove portion that allows loop portion 108 of actuation connection structure 114 to pass through slot openings 124.

The slot openings associated with cutting mechanism 102 and the slot openings associated with gripping mechanism 104 have different widths. The slot opening width associated with gripping mechanism 104 is wider than the slot opening width associated with cutting mechanism 102. In some embodiments, the slot opening width associated with cutting mechanism 102 is the width of actuation connection structure 114. In some embodiments, the slot opening width associated with cutting mechanism 102 is wider than a width of actuation connection structure 114 by a threshold amount (e.g., 2 mm), but narrower than a slot width associated with gripping mechanism 104.

Figure 2B:
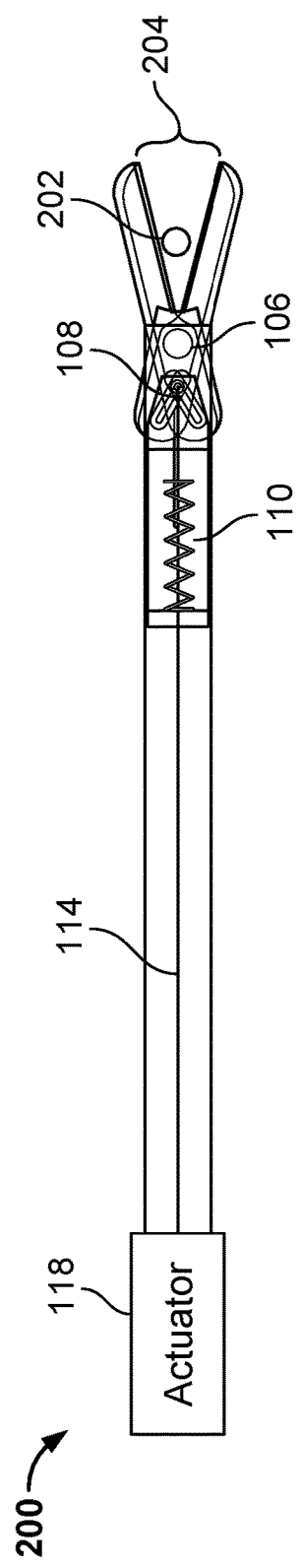
FIG. 2B is a diagram illustrating a top-down view of an end effector in accordance with some embodiments.

FIGS. 2A, 2B are diagrams illustrating an embodiment of a side view and a top-down view of an end effector, respectively. In the example shown, end effector 200 is in an open state. Cutting mechanism 102 and gripping mechanism 104 are both in an open position. An appendage 202 is placed in an opening 204.

In some embodiments, end effector 200 is in a closed position, for example, as seen in FIGS. 1A-1C. To open end effector 200, actuator 118 may apply a force to actuation connection structure 114. For example, the applied force may push actuation connection structure 114 towards a distal end of end effector 200. The applied force may cause the loop portion 108 to move from a proximal end of the slot openings associated with cutting mechanism 102 and gripping mechanism 104 towards a distal end of the slot openings associated with cutting mechanism 102 and gripping mechanism 104. The loop portion 108 of actuation connection structure 114 may transfer the applied force to slot openings associated with cutting mechanism 102 and gripping mechanism 104. The loop portion 108 of actuation connection structure 114 is interlocked with the slot openings associated with cutting mechanism 102 and gripping mechanism 104. As a result, the force applied to the slot openings associated with cutting mechanism 102 and gripping mechanism 104 causes the jaws of cutting mechanism 102 and gripping mechanism 104 to rotate open, in parallel, around pivot component 106. The degree to which the jaws of cutting mechanism 102 and gripping mechanism 104 open is based on the amount of force applied by actuator 118.

In other embodiments, actuation connection structure 114 is rigid at distal portion (e.g., the tip) and includes a spring (not shown) that is coupled to a cable. In response to the cable being pulled, the spring is configured to push the distal end, which causes cutting mechanism 102 and gripping mechanism 104 to close. In response to the cable being released, the spring causes cutting mechanism 102 and gripping mechanism to open.

Figure 2C:
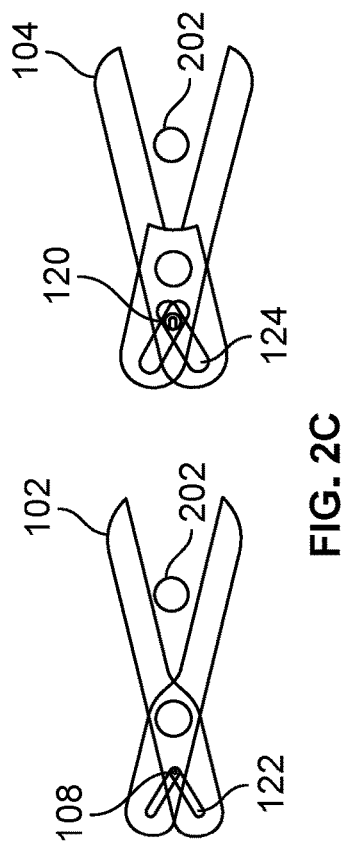
FIG. 2C is a diagram illustrating a top-down view of a cutting mechanism and a gripping mechanism in accordance with some embodiments.

FIG. 2C is a diagram illustrating an embodiment of a top-down view of a cutting mechanism and a gripping mechanism. In the example shown, cutting mechanism 102 and gripping mechanism 104 are both in an open position. An appendage 202 is placed in an opening associated with cutting mechanism 102 and an opening associated with gripping mechanism 104. The loop portion 108 of actuation connection structure 114 is located at a distal end of the slot openings 122, 124.

FIGS. 3A, 3B are diagrams illustrating an embodiment of a side view and a top-down view of an end effector, respectively. In the examples shown, the end effector 300 is in a closed state.

In one embodiment, end effector 300 is in an open position, for example, as seen in FIGS. 2A-2C. To close the end effector 300, actuator 118 applies a force to actuation connection structure 114. For example, the applied force pulls actuation connection structure 114 towards a proximal end of the end effector. The applied force causes the loop portion 108 of actuation connection structure 114 to move from a distal end of the slot openings associated with cutting mechanism 102 and gripping mechanism 104 towards a proximal end of the slot openings associated with cutting mechanism 102 and gripping mechanism 104. In the example shown, loop portion 108 has moved a distance 304.

The loop portion 108 of actuation connection structure 114 transfers the applied force to slot openings associated with cutting mechanism 102 and gripping mechanism 104. The loop portion 108 of actuation connection structure 114 is interlocked with the slot openings associated with cutting mechanism 102 and gripping mechanism 104. The width of slot openings 122 associated with cutting mechanism 102 may be the width of loop portion 108 of actuation connection structure 114. As a result of this configuration, the force applied to the slot openings associated with cutting mechanism 102 and gripping mechanism causes the jaws of cutting mechanism 102 and gripping mechanism 104 to rotate closed, in parallel, around pivot component 106. The applied force initially causes gripping mechanism 104 to grip appendage 202.

The applied force initially causes gripping mechanism 104 to grip appendage 202. As more force is applied, the applied force causes cutting mechanism 102 to perform a bypass cut of appendage 202, which causes appendage 202 to split into a first portion 302a and a second portion 302b. The amount of force with which cutting mechanism 102 applies to appendage 202 is proportional to the force applied by actuator 118.

The amount of force with which gripping mechanism 104 applies to appendage 202 is limited by bias component 110 and bias limiting component 112. When placed in between a proximal end of bias limiting component 112 and a proximal end of loop portion 108, bias component 110 is preloaded with a particular amount of force. The preloaded force may be a force that is unable to cut an appendage, regardless of the appendage diameter (e.g., 1 mm-1 cm). For example, bias component 110 may be preloaded with 20 lbs. of force. In some embodiments, the preloaded amount is within a threshold of the particular amount of force (e.g., ±5 lbs.).

When actuator 118 applies a force to actuation connection structure 114, the force causes bias component 110 to compress. The amount of compression experienced by bias component 110 is based on Hooke's law ($F=kx^2$). The amount of force with which gripping mechanism 104 applies to appendage may not exceed the preloaded amount of force within the threshold amount. In the event the amount of force applied by actuator 118 increases, the amount of force applied by gripping mechanism 104 to appendage 302b does not exceed the preloaded amount of force within a threshold amount.

After end effector 300 cuts appendage 200 into a first portion 302a and a second portion 302, a robotic arm coupled to end effector 300 may move end effector 300 to a location at which the harvested object is stored. Actuator 118 applies a force that causes cutting mechanism 102 and gripping mechanism to open, for example as shown in FIGS. 2A, 2B. The harvested object attached to the second portion 302 may be placed in a temporary storage location (e.g., bin, tray) associated with a robotic system that includes the robotic arm. As a result, the end effector is able to harvest an object from the plant without damaging the harvested object.

FIG. 3C is a diagram illustrating an embodiment of a top-down view of a cutting mechanism and a gripping mechanism. In the example shown, cutting mechanism 102 and gripping mechanism 104 are both in a closed position. Cutting mechanism 102 has split appendage 202 into a first portion 302a and a second portion 302b. The first portion 302a may stay attached to the plant after being separated from appendage 202 while the second portion 302b is grasped by gripping mechanism 104.

In the example shown, the loop portion 108 of actuation connection structure 114 is located at a proximal end of distal end of the slot openings 122. The knob feature 120 of bias limiting mechanism 112 has moved from a distal end of slot openings 124 towards a proximal end of slot openings 124, but has not fully moved towards the proximal end of slot openings 124 because gripping mechanism 104 is grasping the second portion 302b of appendage 202. In the event gripping mechanism 104 failed to grasp the second portion 302b of appendage 202 after cutting mechanism 102 split appendage 202, the knob feature 120 of bias mechanism completely moves towards the proximal end of slot openings, for example, as seen in FIG. 1C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An end effector, comprising:
a cutting mechanism that includes a cutting set of jaws;
a gripping mechanism that includes a gripping set of jaws;
a pivot component, wherein the cutting mechanism and the gripping mechanism are coupled to the pivot component, wherein the cutting mechanism is coupled to a first portion of the pivot component and the gripping mechanism is coupled to a second portion of the pivot component;
an actuation connection structure, wherein the actuation connection structure includes a straight portion and a loop portion, wherein the loop portion of the actuation connection structure is coupled to the cutting mechanism via slot openings associated with the cutting mechanism and coupled to the gripping mechanism via slot openings associated with the gripping mechanism, wherein a width of the slot openings associated with the cutting mechanism is less than a width of the slot openings associated with the gripping mechanism; and
an actuator coupled to the actuation connection structure and configured to apply a force to the actuation connection structure that causes the cutting mechanism and the gripping mechanism to close in parallel.

2. The end effector of claim 1, wherein the first portion is a top portion of the pivot component and the second portion is a bottom portion of the pivot component.

3. The end effector of claim 1, wherein the first portion is a bottom portion of the pivot component and the second portion is a top portion of the pivot component.

4. The end effector of claim 1, further comprising a bias mechanism, wherein the bias mechanism is coupled to the gripping mechanism.

5. The end effector of claim 4, wherein the bias mechanism is configured to apply to the gripping mechanism a bias force within a threshold amount.

6. The end effector of claim 4, wherein the bias mechanism is a spring.

7. The end effector of claim 4, wherein the bias mechanism is preloaded with a particular amount of force within a threshold amount of force.

8. The end effector of claim 4, wherein the bias mechanism is coupled to a bias limiting component.

9. The end effector of claim 8, wherein the bias limiting component includes a groove portion.

10. The end effector of claim 9, wherein the groove portion is U-shaped.

11. The end effector of claim 9, wherein the groove portion allows the loop portion of the actuation connection structure to pass through the slot openings associated with the gripping mechanism.

12. The end effector of claim 1, further comprising a housing, wherein the actuation connection structure, a proximal end of the cutting mechanism, and a proximal end of the gripping mechanism are located within the housing.

13. The end effector of claim 1, wherein in response to the force from the actuator, the actuation connection structure causes the gripping mechanism to grip an appendage of a plant.

14. The end effector of claim 13, wherein in response to the force from the actuator, the actuation connection structure causes the cutting mechanism to perform a cut of the appendage, wherein the appendage is split into a first appendage portion and a second appendage portion, wherein the gripping mechanism is configured to grasp the second appendage portion.

* * * * *